United States Patent
Marich et al.

(10) Patent No.: US 9,716,284 B2
(45) Date of Patent: Jul. 25, 2017

(54) HEAT RECLAMATION AND TEMPERATURE CONTROL FOR SUBMERSIBLE VEHICLES THAT UTILIZE FUEL CELLS

(71) Applicant: The Boeing Company, Chicago, IL (US)

(72) Inventors: Michael J Marich, Yorba Linda, CA (US); Joshua M Mermelstein, Laguna Niguel, CA (US); Michael Webber, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 14/319,091

(22) Filed: Jun. 30, 2014

(65) Prior Publication Data

US 2015/0380748 A1    Dec. 31, 2015

(51) Int. Cl.
*H01M 8/04* (2016.01)
*H01M 8/0612* (2016.01)
(Continued)

(52) U.S. Cl.
CPC ............ *H01M 8/0618* (2013.01); *B63G 8/36* (2013.01); *F02G 1/043* (2013.01); *H01M 8/04014* (2013.01); *H01M 8/0432* (2013.01); *H01M 8/0435* (2013.01); *H01M 8/04067* (2013.01); *H01M 8/04373* (2013.01); *H01M 8/04701* (2013.01); *H01M 8/04716* (2013.01);
(Continued)

(58) Field of Classification Search
None
See application file for complete search history.

(56) References Cited

U.S. PATENT DOCUMENTS 6,740,439 B2   5/2004  Ban
2010/0055517 A1*  3/2010  Uzhinsky ............... C01B 3/065
                                                                  429/495

FOREIGN PATENT DOCUMENTS

CA        2394924 A1 *  5/2002
CN        102975836 A    9/2015
JP        2010174686 A *  8/2010

OTHER PUBLICATIONS

Bratt, The 4-95 Stirling Engine for Underwater Application, Kockums Marine AB.
(Continued)

*Primary Examiner* — Daniel Gatewood
(74) *Attorney, Agent, or Firm* — Duft Bornsen & Fettig LLP

(57) ABSTRACT

Embodiments described herein provide for heat reclamation and temperature control of a SOFC for a submersible vehicle. The vehicle includes a SOFC, a hot box that surrounds the SOFC, a cooling loop, and a Stirling engine. The cooling loop has a heat exchanger and a coolant pump. The heat exchanger thermally couples the cooling loop to the water. The Stirling engine has a first end thermally coupled to an interior of the hot box and a second end thermally coupled to the cooling loop. The coolant pump modifies a rate of heat removal from the second end of the Stirling engine based on a pump control signal. A thermal management controller monitors a temperature of a cathode outlet of the SOFC, and modifies the pump control signal to maintain the temperature of the cathode outlet within a temperature range.

17 Claims, 5 Drawing Sheets

(51) Int. Cl.
| | |
|---|---|
| H01M 8/0432 | (2016.01) |
| B63G 8/36 | (2006.01) |
| F02G 1/043 | (2006.01) |
| H01M 8/04014 | (2016.01) |
| H01M 8/04007 | (2016.01) |
| H01M 8/04701 | (2016.01) |
| H01M 8/124 | (2016.01) |
| B63G 8/00 | (2006.01) |
| B63H 21/00 | (2006.01) |

(52) U.S. Cl.
CPC .. *B63G 2008/004* (2013.01); *B63H 2021/003* (2013.01); *H01M 2008/1293* (2013.01); *H01M 2250/20* (2013.01); *H01M 2250/407* (2013.01); *Y02E 60/525* (2013.01); *Y02E 60/563* (2013.01); *Y02T 90/32* (2013.01); *Y02T 90/38* (2013.01)

(56) References Cited

OTHER PUBLICATIONS

Buckmaster, Analysis of a Stirling-Cycle Power Convertor for Domestic Combined Heat and Power, 978-1-4577-0776-6/11/$26.00 © 2011 IEEE.

Gay, Energetic Macroscopic Representation of a Solid Oxide Fuel Cell for Stirling Engine combined cycle in High-efficient Powertrains. University of Franche-Comte, FEMTO-ST / FCLAB.

Kongtragool, A review of solar-powered Stirling engines and low temperature differential Stirling engines. Renewable and Sustainable Energy Reviews. Oct. 3, 2002.

Munoz, Analysis of Hybrid SOFC-Stirling Engine Plants, Technical University of Denmark, Thermal Energy Systems, Department of Mechanical Engineering. Feb. 10, 2011.

Psallidas, Design of Conventional Submarines with Advanced Air Independent Propulsion Systems and Determination of Corresponding Theater-Level Impacts. Massachusetts Institute of Technology, Cambridge, Massachusetts. 2010, American Society of Naval Engineers.

Whitman, Air-Independent Propulsion, AIP Technology Creates a New Undersea Threat, http://www.navy.mil/navydata/cno/n87/issue_13/propulsion.htm.

Alanne, et al., Techno-economic assessment and optimization of Stirling engine micro-cogeneration systems in residential buildings. Energy Conversion and Management 51 (2010) 2635-2646, Jun. 22, 2010.

Conroy et at., Validated dynamic energy model for a Stirling engine-CHP unit using field trial data from a domestic dwelling. Energy and Buildings 62 (2013) 18-26. Jan. 12, 2013.

Cool Energy, How it Works, http://coolenergy.com/how-it-works/.

Hagen et al., Making AUVs Truly Autonomous, Norwegian Defence Research Establishment (FFI), www.intechopen.com.

Nowak, UUV Power and Energy System Overview, Unmanned Undersea Vehicle (UUV) Energy ONR Industry Day Feb. 8, 2011.

Schreiber et al., Overview of NASA GRC Stirling Technology Development, NASA/TM-2004-212969. Aug. 2003.

Shaneb et at., Sizing of residential CHP systems, Energy and Buildings. Energy and Buildings 43 (2011) 1991-2001, Apr. 10, 2011.

Slaby, Overview of Free-Piston Stirling Technology at the NASA Lewis Research Center, DOE/NASA/1005-7, NASA TM-87156.

SolarHeart> Engines Overview, © 2014 Cool Energy, Inc.

Escalona et al., Performance analysis of hybrid systems incorporating high temperature fuel cells and closed cycle heat engines at part-load operation, Aug. 23, 2012.

Smith et al., Analysis of Hybrid Fuel-Cell/Stirling-Engine Systems for Domestic Combined Heat and Power, 978-1-4673-1835-8/12/$31.00 © 2012 IEEE.

Snachez, Stirling based fuel cell hybrid systems: An alternative for molten carbonate fuel cells, Journal of Power Sources 192 (2009) 84-93.

Winkler et al., Design studies of mobile applications with SOFC-heat engine modules, Journal of Power Sources 106 (2002) 338-343.

Waters, Modeling a Hybrid Rankine-Cycle/SOFC UUV Propulsion System Powered by Aluminum-Water Combustion. AIAA 2012-1134, Jan. 2012.

Kockums Stirling AIP System, Air-independent propulsion under water, http://www.kockums.se/en/products-services/submarines/stirling-aip-system. Jun. 30, 2014.

\* cited by examiner

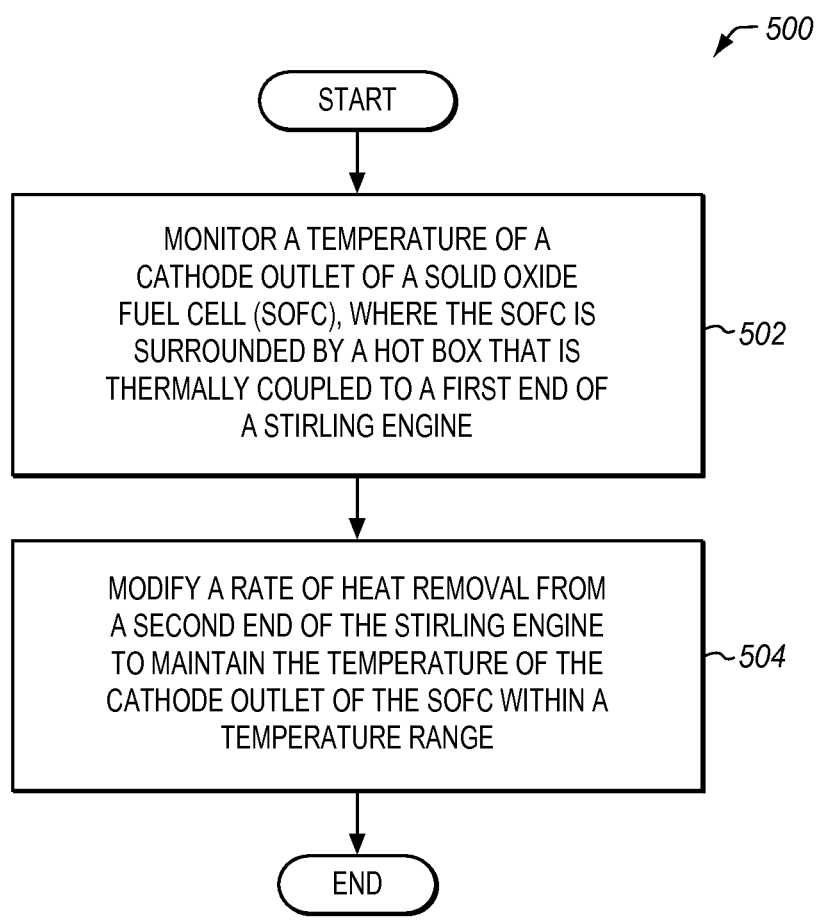

HEAT RECLAMATION AND TEMPERATURE CONTROL FOR SUBMERSIBLE VEHICLES THAT UTILIZE FUEL CELLS

FIELD

This disclosure relates to the field of submersible vehicles, and in particular, to submersible vehicles that utilize Solid Oxide Fuel Cells (SOFCs) for electrical power generation.

BACKGROUND

Submersible vehicles (e.g., Unmanned Underwater Vehicles (UUVs)) sometimes utilize fuel cells to generate electricity. One example of a fuel cell is a Solid Oxide Fuel Cell (SOFC). SOFCs operate by electrochemically converting fuel and oxygen into electricity and heat. Typical SOFCs operate between about 650-850 degrees Celsius, and the conversion process is exothermic. This generates a large amount of waste heat which can be problematic in a UUV. Typically, the waste heat is removed from the UUV using a cooling loop, which transfers the heat to the water that surrounds the UUV.

For temperature control of the SOFC itself, a cathode blower is utilized to both provide oxygen to the cathode of the SOFC and to provide cooling to the SOFC. When the temperature of the SOFC rises near the upper end of the operating range, the speed of the cathode blower is increased to provide additional cooling to the SOFC. However, the cathode blower may utilize a significant amount of parasitic electrical power from the SOFC for the cooling activity, which reduces the electrical power that is available for the UUV. For instance, a cathode blower may utilize as much as 20% of the total electrical power generated from the SOFC when operated at its maximum flow rate. This maximum flow rate is often much higher than the flow rate that is necessary for oxidizing the fuel at the SOFC.

SUMMARY

Embodiments described herein provide for heat reclamation and temperature control of a SOFC for a submersible vehicle utilizing a Stirling engine. The Stirling engine utilizes a temperature differential to generate usable work, which may then be used in the vehicle to augment the electrical generation capability of the SOFC. Further, the Stirling engine operates as a variable heat sink in the SOFC that can control the temperature of the SOFC. For instance, by increasing the temperature differential across the Stirling engine, a temperature of the SOFC can be controlled without resorting to a high cathode blower flow rate. This improves the efficiency of the system by reducing the parasitic losses from the cathode blower.

One embodiment is a vehicle that is configured to submerge in water. The vehicle includes a SOFC that has a cathode inlet, a cathode outlet, an anode inlet, and an anode outlet. The vehicle further includes a hot box that surrounds the SOFC. The vehicle further includes a cooling loop that includes a heat exchanger and a coolant pump. The heat exchanger thermally couples the cooling loop to the water. The vehicle further includes a Stirling engine that has a first end thermally coupled to an interior of the hot box, and a second end thermally coupled to the cooling loop. The coolant pump is configured to modify a rate of heat removal from the second end of the Stirling engine based on a pump control signal. The vehicle further includes a thermal management controller that is configured to monitor a temperature of the cathode outlet of the SOFC, and to modify the pump control signal to maintain the temperature of the cathode outlet of the SOFC within a temperature range.

Another embodiment is a vehicle configured to submerge in water. The vehicle includes a SOFC that has a cathode inlet, a cathode outlet, an anode inlet, and an anode outlet. The vehicle further includes a hot box that surrounds the SOFC. The vehicle further includes a cathode blower having an outlet and an inlet. The inlet of the cathode blower is coupled to the cathode outlet of the SOFC. The cathode blower is configured to modify a rate of cooling provided to the SOFC based on a cathode blower control signal. The vehicle further includes a Stirling engine having a first end thermally coupled to an interior of the hot box and a second end coupling the outlet of the cathode blower to the cathode inlet of the SOFC. The cathode blower is configured to modify a rate of heat removal from the second end of the Stirling engine based on the cathode blower signal. The vehicle further includes a thermal management controller that is configured to monitor a temperature of the cathode outlet of the SOFC, and to modify the cathode blower control signal to maintain the temperature of the cathode outlet of the SOFC within a temperature range.

Another embodiment is a method of controlling a temperature of a SOFC utilizing a Stirling engine. The method comprises monitoring a temperature of a cathode outlet of a SOFC, where the SOFC is surrounded by a hot box that is thermally coupled to a first end of the Stirling engine. The method further comprises modifying a rate of heat removal from a second end of the Stirling engine to maintain the temperature of the cathode outlet of the SOFC within a temperature range.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 5 is a flow chart of a method of controlling a temperature of a SOFC utilizing a Stirling engine in an exemplary embodiment.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
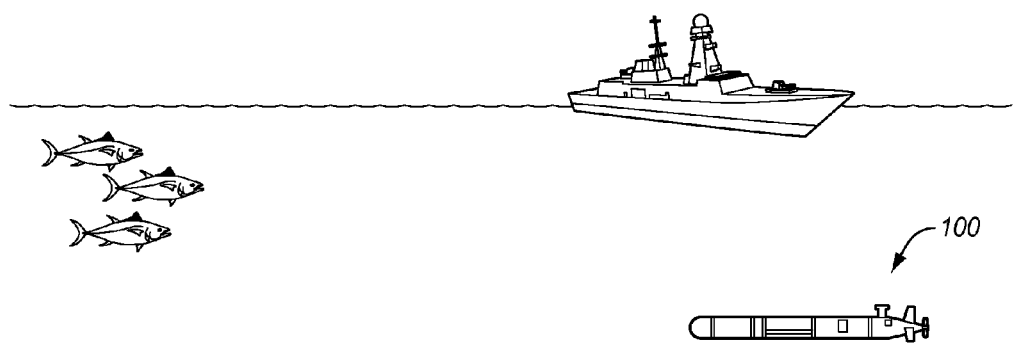
FIG. 1 illustrates a submersible vehicle that utilizes a Stirling engine for heat reclamation and temperature control of a SOFC in an exemplary embodiment.

FIG. 1 illustrates a submersible vehicle 100 that utilizes a Stirling engine for heat reclamation and temperature control of a SOFC in an exemplary embodiment. In this embodiment, vehicle 100 is depicted as an Unmanned Underwater Vehicle (UUV), although in other embodiments, vehicle 100 may be any type of vehicle that is able to submerge under water and utilize a SOFC fuel cell to generate electricity.

In this embodiment, vehicle 100 is an underwater vehicle that utilizes an onboard energy source that allows vehicle 100 to operate for long periods of time without surfacing. Typically, underwater vehicles utilize nuclear power sources or batteries to provide electrical power to the vehicle. However, in this embodiment, vehicle 100 utilizes an onboard fuel cell (e.g., a SOFC) which is supplied a locally stored fuel (e.g., a hydrocarbon fuel) and a locally stored oxidizer (e.g., oxygen) to allow for long duration under water missions without surfacing.

SOFCs generate a significant amount of waste heat due to the exothermic oxidation of the fuel within the SOFC that is typically removed by transferring the waste heat to the water the vehicle is operating within. In addition, SOFCs require cooling to prevent the SOFCs from exceeding their maximum operating temperature. This cooling is typically performed by operating the cathode blower for the SOFC at a higher rate than is necessary for the fuel oxidation rate at the SOFC. This increases the parasitic electrical losses in the system and decreases the efficiency. In the embodiments described herein, vehicle 100 utilizes a SOFC in combination with a Stirling engine to reclaim some of the waste heat generated by the SOFC and also to control the temperature of the SOFC. This allows the cathode blower to operate at lower speeds, which reduces the parasitic losses of the system and increases the efficiency. Also, the reclaimed waste heat can be used by the Stirling engine in some embodiments to spin a generator head, which can augment the electricity generated by the SOFC. This allows vehicle 100 to operate for longer periods without refueling.

Figure 2:
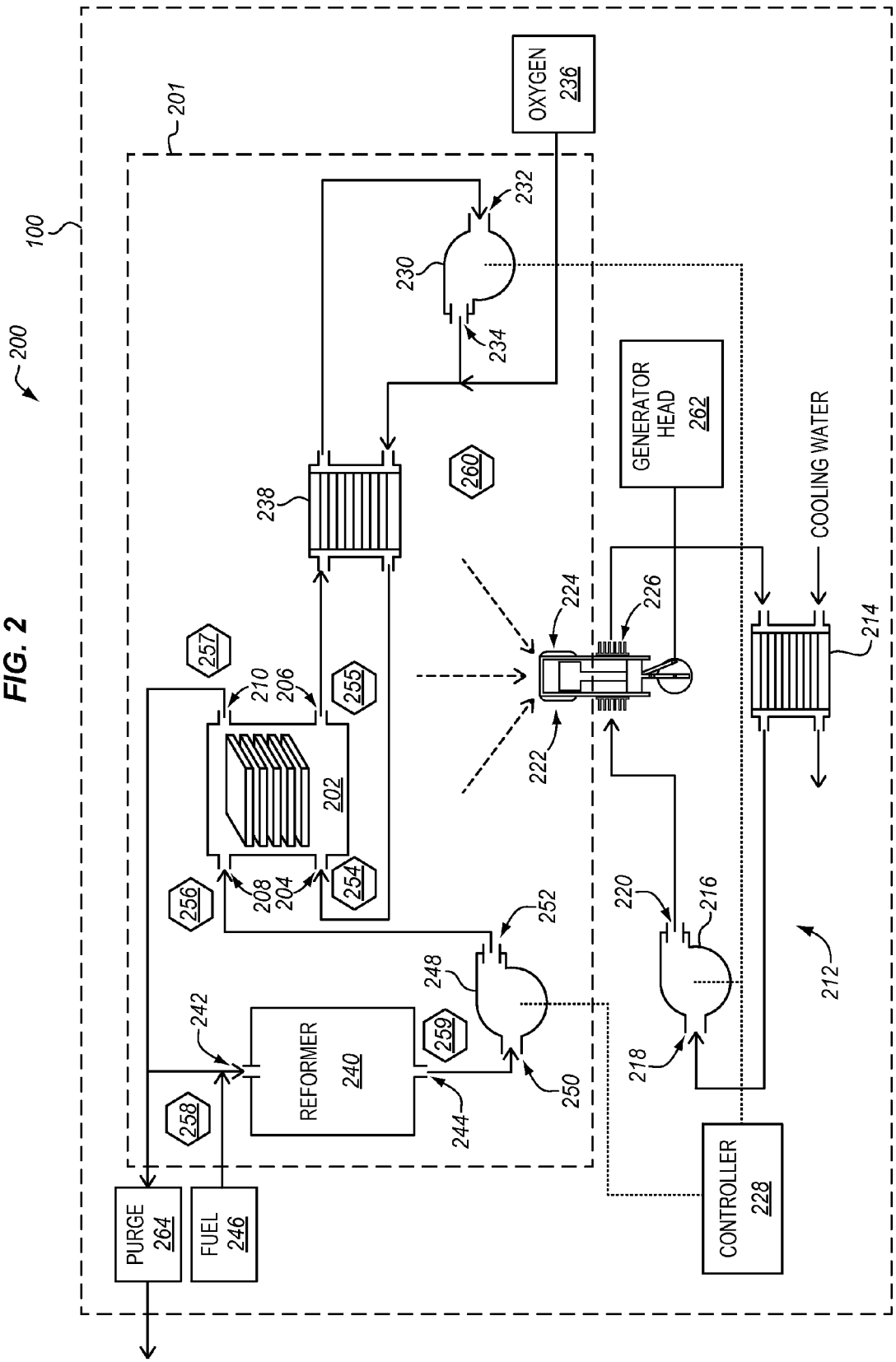
FIG. 2 is a block diagram of a submersible vehicle that utilizes a Stirling engine for heat reclamation and temperature control for a SOFC in an exemplary embodiment.

FIG. 2 is a block diagram 200 of vehicle 100 that utilizes a Stirling engine 222 for heat reclamation and temperature control for a SOFC 202 in an exemplary embodiment. Block diagram 200 is simplified representation of SOFC 202 and a number components that are used to support the operation of SOFC 202, and one skilled in the art will understand that additional components (e.g., valves, coolant loops, blowers, etc.), not shown, may be utilized as a matter of design choice.

In this embodiment, a fuel 246 combines with oxygen 236 within SOFC 202 and is oxidized to generate electricity for vehicle 100. Fuel 246 may include any type of hydrogen based fuel as a matter of design choice (e.g., $H_2$), although heavy hydrocarbon fuels may be used due to their higher energy density. Some examples of heavy-hydrocarbon fuels are alcohols, gasoline, diesel, and jet fuel. When heavy-hydrocarbon fuels are used, a fuel reformer 240 is used to generate free $H_2$ for use by SOFC 202, which is provided to the anode side of SOFC 202 (e.g., via an anode inlet 208) by an anode blower 248. Un-oxidized $H_2$ and water exit SOFC 202 (e.g., via an anode outlet 210) and are returned to the reformer 240. An anode purge system 264 removes generated $H_2O$ and $CO_2$.

Oxygen 236 may be highly compressed $O_2$ or liquefied $O_2$ as a matter of design choice. Liquefied $O_2$ provides a higher density, which results in a longer mission time for vehicle 100. Oxygen 236 is provided to the cathode side of SOFC 202 (e.g., via cathode inlet 204) by a cathode blower 230. An outlet 234 of cathode blower 230 may be fed to a heat exchanger 238 to pre-heat the oxygen that is fed to SOFC 202, which may be less than about 100 degrees Celsius before being routed to heat exchanger 238. Heat exchanger 238 has a hot side tied to a cathode outlet 206 of SOFC 202, which is at a high temperature. The exhaust of the hot side of heat exchanger 238 is routed back to an inlet 232 of cathode blower 230. The heat generated during the oxidation process is retained within a hot box 201, which includes SOFC 202 along with other high-temperature components used to operate SOFC 202. The temperatures within hot box 201 can be between about 800 degrees Celsius and 1000 degrees Celsius.

FIG. 2 also illustrates a number of temperature sensors 254-260, which are used to monitor various temperatures within the interior of hot box 201. Sensors 254-255 measure the temperatures of cathode inlet 204 and cathode outlet 206 of SOFC, respectively. Sensors 256-257 measure the temperatures of anode inlet 208 and anode outlet 210 of SOFC 202, respectively. Sensors 258-259 measure the temperatures of an inlet 242 and an outlet 244 of reformer 240, respectively. Sensor 260 measures the temperature within the interior of hot box 201.

In this embodiment, Stirling engine 222 is used to reclaim waste heat generated within hot box 201, and to provide temperature control for SOFC 202 and/or other components within hot box 201. Stirling engine 222 includes a hot side 224 and a cold side 226. Hot side 224 is thermally coupled to the interior of hot box 201, and absorbs radiant heat from within hot box 201. Cold side 226 is thermally coupled to a cooling loop 212. A temperature difference between hot side 224 and cold side 226 heats a working gas within Stirling engine 222 to drive one or more pistons (not shown) that rotate a shaft. During operation of Stirling engine 222, heat flows from hot side 224 to cold side 226. This allows heat to be removed from hot box 201 at a variable rate depending on the temperature differential between hot side 224 and cold side 226. In some embodiments, Stirling engine 222 is coupled to a generator head 262, which provides electrical power to vehicle 100 in addition to the electricity generated by SOFC 202.

Cooling loop 212 is used to remove heat from cold side 226 of Stirling engine 222 and to provide the temperature differential between hot side 224 and cold side 226. Cooling loop 212 in this embodiment includes a coolant pump 216, which has an outlet 220 that is coupled to cold side 226 of Stirling engine 222 and an inlet 218 that is coupled to a heat exchanger 214. Coolant pump 216 circulates a coolant (e.g., water, glycol, etc.), which circulates around cooling loop 212. Heat from cold side 226 of Stirling engine 222 is transferred to the coolant in cooling loop 212, which is then transferred to cooling water in heat exchanger 214. The cooling water used by heat exchanger 214 may be the water that vehicle 100 is operating within.

In this embodiment, a thermal management controller 228 includes any component, system, or device that is able to monitor temperatures within the interior of hot box 201 via sensors 254-260, and to control the temperatures by varying the rate of heat removal from cold side 226 of Stirling engine 222. To do so, controller 228 varies a pump control signal applied to coolant pump. 216, which varies the flow rate of coolant within cooling loop 212. When the flow rate of the coolant is increased, a larger thermal gradient is created across hot side 224 and cold side 226 of Stirling engine 222. This increases the speed of Stirling engine 222 and increases the amount of thermal energy that is converted to useful work (e.g., generating electricity). When the flow rate of the coolant is decreased, a smaller thermal gradient is created across hot side 224 and cold side 226 of Stirling engine 222. This decreases the speed of Stirling engine 222 and decreases the amount of thermal energy that is converted to useful work (e.g., generating electricity). Using Stirling engine 222, the temperature of SOFC 202 and/or other components within hot box 201 can be controlled. When temperatures of SOFC 202 are controlled utilizing Stirling engine 222, the cooling that would normally be provided by cathode blower 230 can be reduced, which reduces the power used by cathode blower 230. This lowers the parasitic power that would normally be consumed by cathode blower 230.

Consider the following examples. In the first example, consider that the temperature of cathode outlet 206 of SOFC 202 is slowly rising. During operation, SOFC 202 oxidizes fuel 246 and generates heat. SOFC 202 radiates heat to the interior of hot box 201 at a rate that generally depends on the temperature differential between SOFC 202 and the interior of hot box 201. Thus, in some cases the temperature differential may be lower, which reduces the heat transfer rate from SOFC 202 to the interior of hot box 201. This causes SOFC 202 to heat up over time. This can be detected by controller 228 using temperature sensor 255 at cathode outlet 206, which is a good proxy for the temperature of SOFC 202. However, SOFC 202 operates more efficiently within a particular temperature range. For instance, it may be desirable to maintain the temperature of SOFC 202 within about +/−100 degrees Celsius of about 750 degrees Celsius. If the temperature drops too low (e.g., about 600 degrees Celsius), then a ceramic electrolyte in SOFC 202 may not transport oxygen ions efficiently from the cathode to the anode. But, if the temperature rises too high (e.g., about 1000 degrees Celsius), then SOFC 202 may be damaged due to thermal stress.

The typical response to SOFC 202 heating up over time towards the high end of the operating temperature is to increase the cathode flow rate to SOFC 202. Controller 228 can increase the cathode flow rate to SOFC 202 by modifying a cathode blower signal that is applied to cathode blower 230. The increased cathode flow rate to SOFC 202 removes heat from SOFC 202 at a faster rate, since the oxygen at outlet 234 of cathode blower 230 is less than about 100 degrees Celsius. This will decrease the temperature of SOFC 202 due to cooling. However, cathode blower 230 will consume more electrical power in order to increase the cathode flow rate, which is inefficient.

Instead of and/or in addition to increasing the cathode flow rate, controller 228 modifies a pump control signal that is applied to coolant pump 216 to increase the flow rate of coolant within cooling loop 212. The increased coolant flow rate allows Stirling engine 222 to consume heat from within hot box 201 at a faster rate, which reduces the cooling requirements of the various elements within hot box 201 (e.g., SOFC 202). The heat consumed by Stirling engine 222 mitigates the amount of cooling that would instead be provided by cathode blower 230. In addition, work performed by Stirling engine 222 can be used to generate electricity, which is a more efficient use of the waste heat generated by SOFC 202 and the components within hot box 201 than simply dumping the waste heat to the water around vehicle 100.

In the next example, consider that the temperature of cathode outlet 206 of SOFC 202 is slowly falling. During operation, SOFC 202 oxidizes fuel 246 and generates heat. SOFC 202 radiates heat to the interior of hot box 201 at a rate that generally depends on the temperature differential between SOFC 202 and the interior of hot box 201. Thus, in some cases the temperature differential may be higher, which increases the heat transfer rate from SOFC 202 to the interior of hot box 201. This causes SOFC 202 to cool down over time. This can be detected by controller 228 using temperature sensor 255 at cathode outlet 206, which is a good proxy for the temperature of SOFC 202.

The typical response to SOFC 202 cooling down over time towards the low end of the operating temperature is to decrease the cathode flow rate to SOFC 202 towards some minimum flow rate that depends on the oxidation rate of fuel 246 at SOFC 202. Controller 228 can decrease the cathode flow rate to SOFC 202 by modifying a cathode blower signal that is applied to cathode blower 230. The decreased cathode flow rate to SOFC 202 removes heat from SOFC 202 at a slower rate, although SOFC 202 may still heat up even when the cathode flow rate to SOFC 202 is at a minimum flow rate.

In this case, controller 228 modifies the pump control signal for coolant pump 216 to decrease the flow rate of coolant within cooling loop 212. The decreased coolant flow rate allows Stirling engine 222 to consume heat from within hot box 201 at a slower rate, which allows SOFC 202 to heat up. In addition, work performed by Stirling engine 222 during this process can be used to generate electricity, which improves the efficiency.

Although the temperature control process performed by controller 228 has been specifically described with respect to the temperature of the cathode outlet 206 of SOFC 202, other control points exist within the interior of hot box 201. For instance, in addition to and/or instead of the temperature of cathode outlet 206, controller 228 may modify the pump control signal applied to coolant pump 216 to control the temperature(s) at inlet 242 of reformer 240 (via sensor 258), outlet 244 of reformer 240 (via sensor 259), the interior of hot box 201 (via sensor 260), cathode inlet 204 (via sensor 254), anode inlet 208 (via sensor 256), and/or anode outlet 210 (via sensor 257). For instance, if cathode blower 230 is at a minimum flow rate, then decreasing temperatures within hot box 201 indicates that Stirling engine 222 is consuming too much heat from within hot box 201. In this case, the pump control signal for cooling pump 216 is modified to decrease the flow rate of coolant within cooling loop 212.

Figure 3:
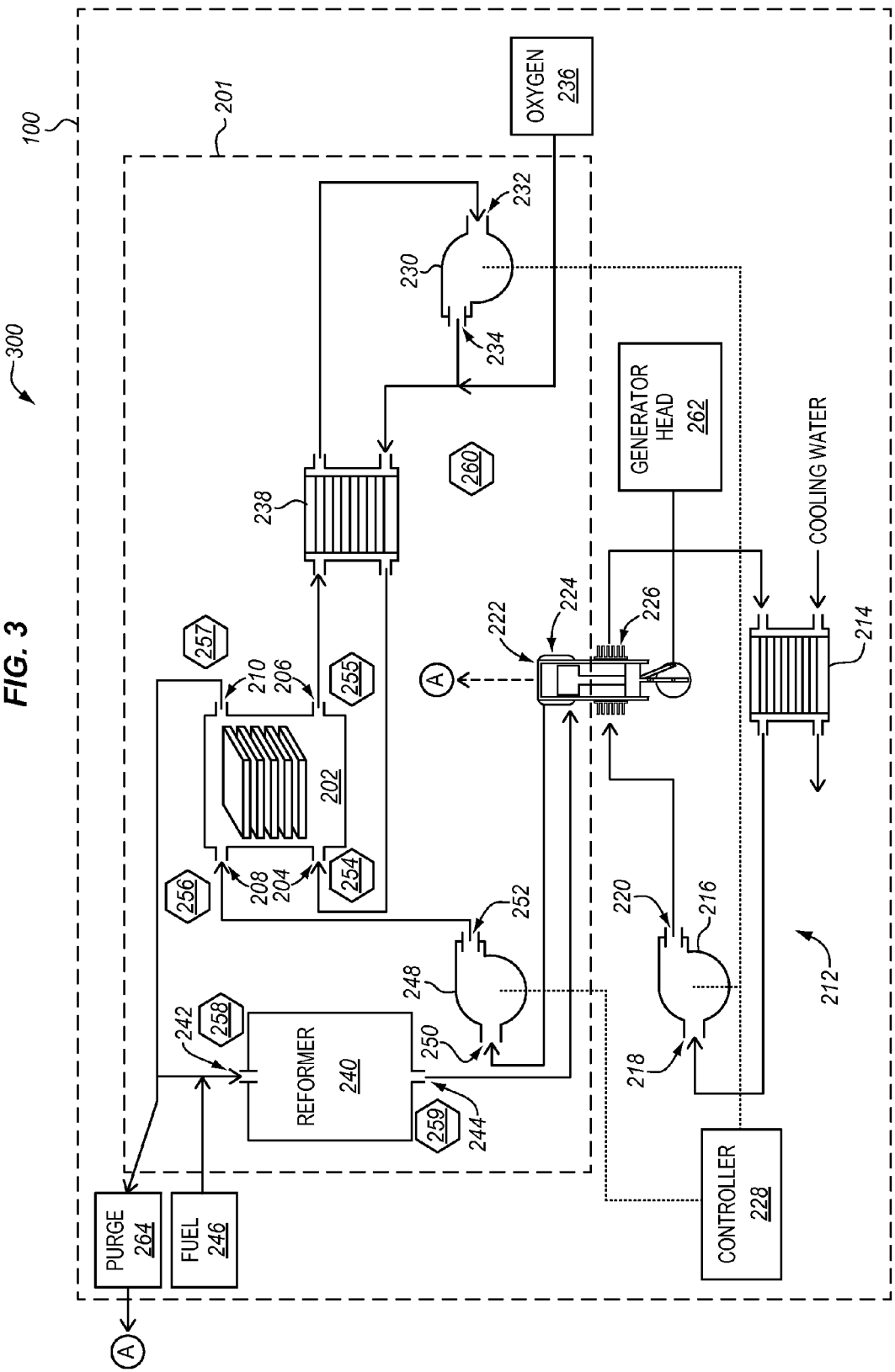
FIG. 3 is a block diagram of a submersible vehicle that utilizes a Stirling engine in an anode blower loop for heat reclamation and temperature control for a SOFC in an exemplary embodiment.

FIG. 3 is a block diagram 300 of vehicle 100 that utilizes Stirling engine 222 in an anode blower loop for heat reclamation and temperature control for SOFC 202 in an exemplary embodiment. In this embodiment, outlet 244 of reformer 240 is routed to hot end 224 of Stirling engine 222, and back to inlet 250 of anode blower 248. This thermally couples the high temperature outlet 244 of reformer 240 to hot end 224 of Stirling engine. During operation, Stirling engine 222 extracts heat from the reformed fuel exiting reformer 240, cooling the reformed fuel before it enters anode blower 248. Typically the reformed fuel is cooled utilizing a separate cooling loop. Thus, Stirling engine 222 is able to recapture waste head from the reformed fuel that would normally be lost. FIG. 3 further illustrates that hot end 224 of Stirling engine 222 is coupled to an anode purge system 264. This allows Stirling engine 222 to extract waste heat from anode purge system 264, which would normally be lost. Heat extraction from the reformed fuel and anode purge system 264 may be performed in addition to capturing radiant heat from the interior of hot box 201.

Figure 4:
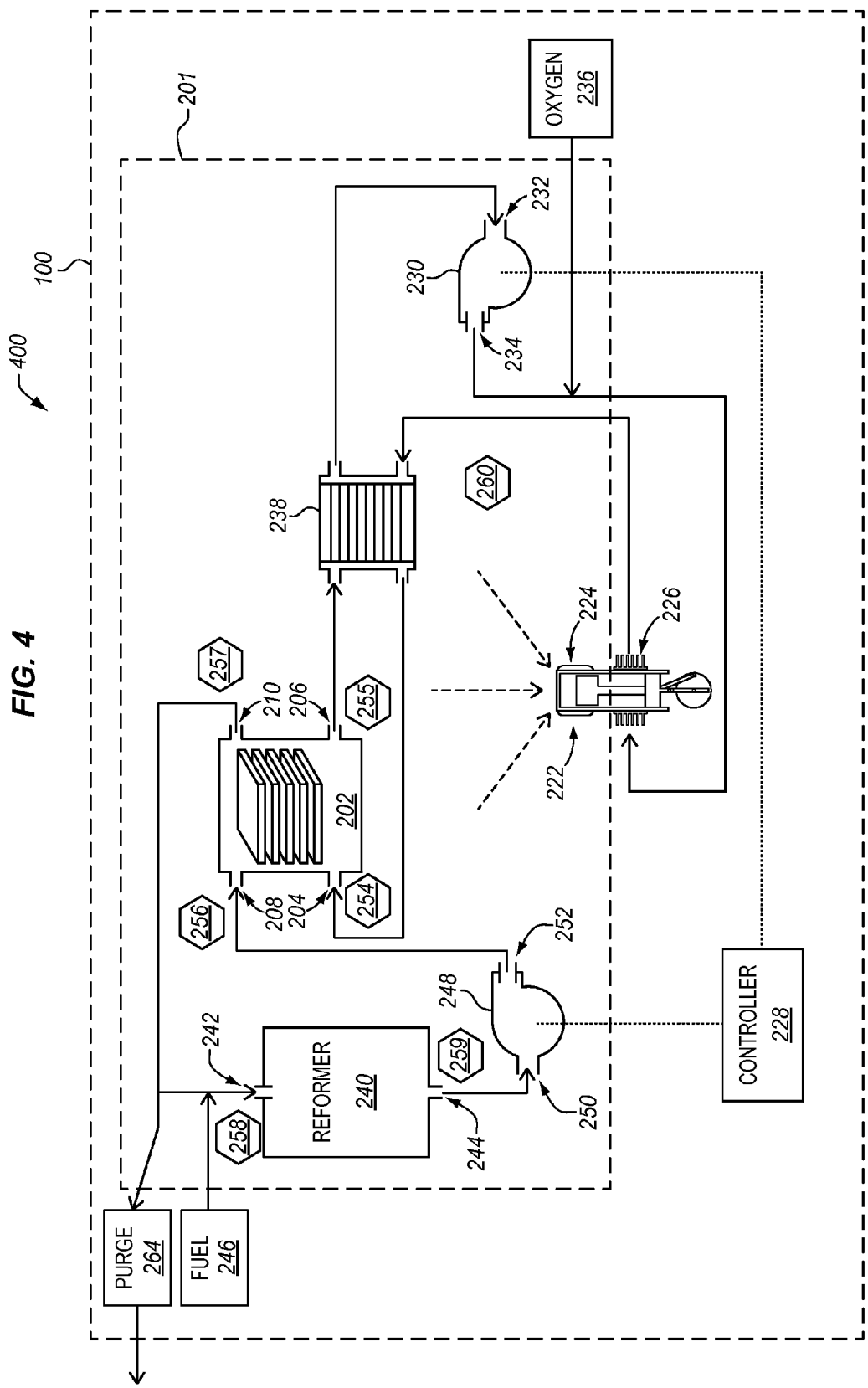
FIG. 4 is a block diagram of a submersible vehicle that utilizes a Stirling engine in a cathode blower loop for heat reclamation and temperature control for a SOFC in an exemplary embodiment.

FIG. 4 is a block diagram 400 of vehicle 100 that utilizes Stirling engine 222 in a cathode blower loop for heat reclamation and temperature control for SOFC 202 in an exemplary embodiment. In this embodiment, outlet 234 of cathode blower 230 is routed to cold end 226 of Stirling engine 222, and back to heat exchanger 238. This allows heat to be transferred from hot end 224 of Stirling engine 222 to the oxygen that is provided to the cathode of SOFC 202. This pre-heats the mixture prior to the mixture being routed to heat exchanger 238, which is typically heated from less than about 100 degrees Celsius to about 650 degrees Celsius. This allows the cooling loop for Stirling engine 222 to be used as part of the pre-heat process for the oxygen provided to the cathode of SOFC 202. Although this embodiment illustrates hot end 224 of Stirling engine 222 as thermally coupled to the interior of hot box 201 for a heat source, any of the previously described sources of heat for hot end 224 may be additionally and/or alternatively used as a matter of design choice.

Utilizing Stirling engine 222, waste heat that would normally be lost to the water vehicle 100 is operating within can be utilized to perform additional work. Further, Stirling engine 222 operates as a variable heat sink, which allows controller 228 to control the temperatures within the interior of hot box 201 by modifying the flow rate of cooling loop 212. In some cases, this may allow cathode blower 230 to operate at lower speeds, which reduces the parasitic electrical losses for vehicle 100.

FIG. 5 is a flow chart of a method 500 of controlling a temperature of a SOFC utilizing a Stirling engine in an exemplary embodiment. The steps of method 500 will be described with respect to controller 228 of FIGS. 2-4, although one skilled in the art will understand that method 500 may be performed by other devices or systems not shown. The steps of method 500 are not all inclusive and may include other steps not shown. In step 502, controller 228 monitors a temperature of cathode outlet 206 of SOFC 202 (e.g., via sensor 255). SOFC 202 is surrounded by hot box 201 and is thermally coupled to hot end 224 of Stirling engine 222. In step 504, controller 228 modifies a rate of heat removal from cold end 226 of Stirling engine (e.g., by varying cooling applied to cold end 226 by cooling loop 212, by varying a flow rate of cathode blower 230, etc.) to maintain the temperature of cathode outlet 26 of SOFC 202 within a temperature range.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
a vehicle that includes a Solid Oxide Fuel Cell (SOFC) and is configured to submerge in water, the vehicle comprising:
   a hot box surrounding the SOFC, wherein the SOFC includes a cathode inlet, a cathode outlet, an anode inlet, and an anode outlet;
   a cooling loop for the vehicle that includes a heat exchanger and a coolant pump, wherein the heat exchanger thermally couples the cooling loop to the water;
   a Stirling engine having a first end thermally coupled to an interior of the hot box and a second end thermally coupled to the cooling loop;
   a generator head coupled to a power output shaft of the Stirling engine;
   an electrical bus for distributing electricity for the vehicle, wherein the SOFC and the generator head are electrically coupled to the electrical bus;
   the coolant pump configured to modify a rate of heat removal from the second end of the Stirling engine based on a pump control signal; and
   a thermal management controller that is configured to monitor a temperature of the cathode outlet of the SOFC, and to modify the pump control signal to maintain the temperature of the cathode outlet of the SOFC within a temperature range.

2. The apparatus of claim 1 further comprising:
a cathode blower having an outlet and an inlet, wherein the inlet of the cathode blower is coupled to the cathode outlet of the SOFC;
wherein the cathode blower is configured to modify a rate of cooling provided to the SOFC based on a cathode blower control signal;
wherein the thermal management controller is configured to modify the pump control signal to increase the rate of heat removal from the second end of the Stirling engine, and to modify the cathode blower control signal to reduce the rate of cooling provided to the SOFC responsive to increasing the rate of heat removal from the second end of the Stirling engine.

3. The apparatus of claim 2 further comprising:
an oxygen source coupled to the outlet of the cathode blower.

4. The apparatus of claim 3 wherein:
the oxygen source is an oxidizer.

5. The apparatus of claim 1 wherein:
the thermal management controller is configured to monitor at least one of a temperature of the anode inlet of the SOFC and a temperature of the cathode inlet of the SOFC, and to modify the pump control signal to maintain at least one of the temperature of the anode inlet of the SOFC and the temperature of the cathode inlet of the SOFC within a temperature range.

6. The apparatus of claim 1 wherein:
the thermal management controller is configured to monitor at least one of a temperature of the interior of the hot box and a temperature of the anode outlet of the SOFC, and to modify the pump control signal to maintain at least one of the temperature of the interior of the hot box and the temperature of the anode outlet of the SOFC within a temperature range.

7. The apparatus of claim 1 wherein:
the first end of the Stirling engine is thermally coupled to the anode outlet of the SOFC.

8. The apparatus of claim 1 further comprising:
a fuel source; and
a fuel reformer having an inlet and an outlet, wherein the inlet of the fuel reformer is coupled to the fuel source and to the anode outlet of the SOFC;
an anode blower having an inlet and an outlet, wherein the outlet of the anode blower is coupled to the anode inlet of the SOFC, wherein the first end of the Stirling engine couples the outlet of the fuel reformer to the inlet of the anode blower.

9. The apparatus of claim 8 wherein:
the thermal management controller is configured to monitor at least one of a temperature of the inlet of the fuel reformer and a temperature of the outlet of the fuel reformer, and to modify the pump control signal to maintain at least one of the temperature of the inlet of the fuel reformer and the temperature of the outlet of the fuel reformer within a temperature range.

10. An apparatus comprising:
a vehicle that includes a Solid Oxide Fuel Cell (SOFC) and is configured to submerge in water, the vehicle comprising:
  a hot box that surrounds the SOFC, wherein the SOFC includes a cathode inlet, a cathode outlet, an anode inlet, and an anode outlet;
  a cathode blower having an outlet and an inlet, wherein the inlet of the cathode blower is coupled to the cathode outlet of the SOFC, wherein the cathode blower is configured to modify a rate of cooling provided to the SOFC based on a cathode blower control signal;
  a Stirling engine having a first end thermally coupled with an interior of the hot box and a second end coupling the outlet of the cathode blower to the cathode inlet of the SOFC, wherein the cathode blower is configured to modify a rate of heat removal from the second end of the Stirling engine based on the cathode blower control signal;
  a generator head coupled to a power output shaft of the Stirling engine;
  an electrical bus for distributing electricity for the vehicle, wherein the SOFC and the generator head are electrically coupled to the electrical bus; and
  a thermal management controller that is configured to monitor a temperature of the cathode outlet of the SOFC, and to modify the cathode blower control signal to maintain the temperature of the cathode outlet of the SOFC within a temperature range.

11. The apparatus of claim 10 further comprising:
an oxygen source coupled to the outlet of the cathode blower.

12. The apparatus of claim 11 wherein:
the oxygen source is an oxidizer.

13. The apparatus of claim 10 wherein:
the thermal management controller is configured to monitor at least one of a temperature of the anode inlet of the SOFC and a temperature of the cathode inlet of the SOFC, and to modify the cathode blower control signal to maintain at least one of the temperature of the anode inlet of the SOFC and the temperature of the cathode inlet of the SOFC within a temperature range.

14. The apparatus of claim 10 wherein:
the thermal management controller is configured to monitor at least one of a temperature of the interior of the hot box and a temperature of the anode outlet of the SOFC, and to modify the cathode blower control signal to maintain at least one of the temperature of the interior of the hot box and the temperature of the anode outlet of the SOFC within a temperature range.

15. The apparatus of claim 10 wherein:
the first end of the Stirling engine is coupled to the anode outlet of the SOFC.

16. The apparatus of claim 10 further comprising:
a fuel source;
a fuel reformer having an inlet and an outlet, wherein the inlet of the fuel reformer is coupled to the fuel source and to the anode outlet of the SOFC; and
an anode blower having an inlet and an outlet, wherein the outlet of the anode blower is coupled to the anode inlet of the SOFC, wherein the first end of the Stirling engine couples the outlet of the fuel reformer to the inlet of the anode blower.

17. The apparatus of claim 16 wherein:
the thermal management controller is configured to monitor at least one of a temperature of the inlet of the fuel reformer and a temperature of the outlet of the fuel reformer, and to modify the cathode blower control signal to maintain at least one of the temperature of the inlet of the fuel reformer and the temperature of the outlet of the fuel reformer within a temperature range.

* * * * *